UNITED STATES PATENT OFFICE.

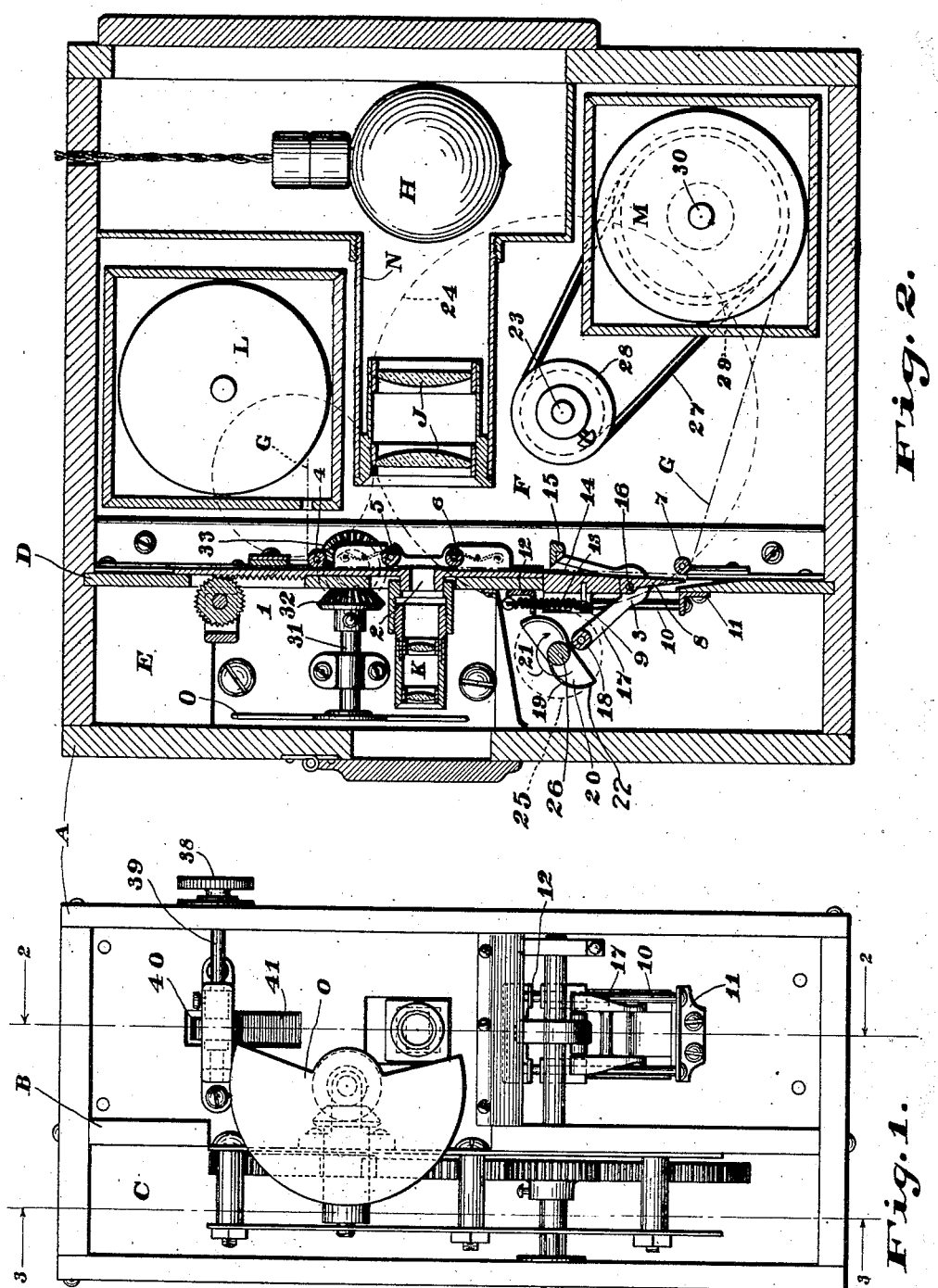

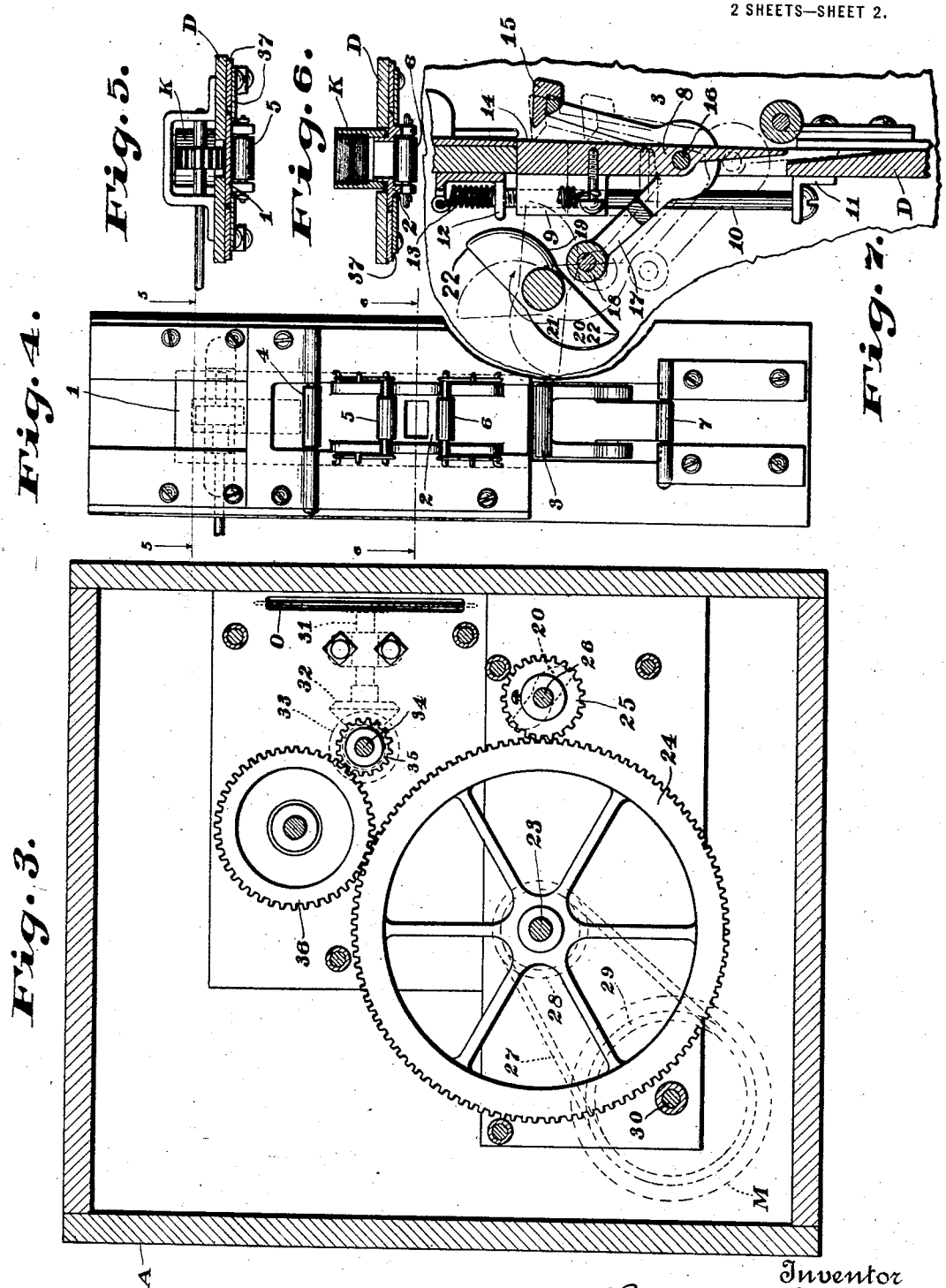
L. E. TAYLOR.
INTERMITTENT FEEDING MECHANISM FOR MOTION PICTURE MACHINES.
APPLICATION FILED MAR. 14, 1916.
1,199,221.
Patented Sept. 26, 1916.
2 SHEETS—SHEET 2.

LUTHER E. TAYLOR, OF WEST NEW YORK, NEW JERSEY, ASSIGNOR TO K-T FILM COMPANY, INCORPORATED, OF WEST NEW YORK, NEW JERSEY, A CORPORATION OF NEW JERSEY.

INTERMITTENT FEEDING MECHANISM FOR MOTION-PICTURE MACHINES.

1,199,221.  Specification of Letters Patent.  Patented Sept. 26, 1916.

Application filed March 14, 1916. Serial No. 84,000.

*To all whom it may concern:*

Be it known that I, LUTHER E. TAYLOR, a citizen of the United States, residing at West New York, in the county of Hudson, State of New Jersey, have invented certain new and useful Improvements in Intermittent Feeding Mechanism for Motion-Picture Machines, of which the following is a specification.

The invention relates to moving picture machines and it is adaptable for use in a machine for the taking of moving pictures and also in a machine for the projecting of moving pictures. It will be manifest that a machine for taking moving pictures and a machine for projecting moving pictures can be embodied, if desired, in the same structure.

In moving picture machines, that is in machines for the taking of moving pictures or machines for the projecting of moving pictures, a film is passed from one storage magazine or reel to another over suitable guides which bring successive portions of the film into operative relationship with the aperture of a face plate.

The object of the present invention is to avoid the necessity of perforations in the film and to provide a suitable means for feeding the film and this is accomplished through the medium of a reciprocating gripping mechanism that is intermittently operated by means hereinafter described.

In the projecting of pictures it is necessary that a certain portion of the film shall be in a certain position relative to the aperture of the face plate, otherwise the picture projected on the screen will not be properly framed. With a gripping jaw mechanism it is difficult to predetermine the exact movement of a long film, due to varying conditions, and in order that the picture will be properly framed the apertured plate is made a part of what will hereinafter be referred to as an adjustable framing device.

One object of the present invention is to provide a commercial and practical intermittent gripping means for moving the film from one operative position relative to the apertured plate to another whereby successive portions of the film can be brought, as desired, into operative position relative to the apertured plate and lenses associated therewith.

The above and other features of the invention will be hereinafter fully pointed out and described in the claims constituting a part of this specification.

As showing a specific embodiment of the invention reference is made to the accompanying drawings forming a part of this specification and in which drawings, Figure 1 is an end view of the forward end of the machine with the front cover removed. Fig. 2 is a vertical sectional view of the machine and is a view taken as on the plane indicated by the line 2—2 Fig. 1 looking in the direction of the arrows. Fig. 3 is a vertical sectional view of the machine and is a view taken as on the plane indicated by the line 3—3 Fig. 1 looking in the direction of the arrows. Fig. 4 is a view illustrating the construction of the framing device including the apertured face plate and film guide rollers. Fig. 5 is a transverse sectional view of the framing device taken as on the plane indicated by the line 5—5 in Fig. 4 looking in the direction of the arrows. Fig. 6 is a transverse sectional view taken as on the plane indicated by the line 6—6 in Fig. 4 looking in the direction of the arrows. Fig. 7 is a vertical sectional view of the film gripper and the means for actuating the same. The structure shown in this figure is on a somewhat larger scale than the same structure as shown in Fig. 2.

The casing of the moving picture machine is designated by A and is substantially in the form of an inclosing box having a vertically but longitudinally extending partition B that separates the operating mechanism in compartment C from the compartments containing the lenses and the film. The box is furthermore provided with a transverse partition D that separates the compartment E at the forward portion of the box from the compartment F at the rear portion of the box. The compartments E and F are the compartments within which the lenses and the film are located.

The partition D has thereupon the framing device 1 which includes the apertured face plate 2 and the mechanism constituting the film gripper 3 whereby the film G can be propelled along the apertured face plate 2.

The moving picture machine is provided with a source of light H, condensing lenses J and objective lenses K, the latter of which are secured to the apertured face plate 2. When the machine is in operation the film G passes from the magazine storage reel L to the magazine or receiving reel M. When the machine is being used as a projecting machine the source of light H and the condensing lenses J are necessarily employed. If, however, the machine is to be merely a camera then the condensing lenses J and source of light H can be omitted. The source of light H and the condensing lenses J are preferably included within a metal box or frame N which serves to prevent the leakage of any light from within the compartment containing the source of light to the rest of the camera and also serves to protect the film from heat from the source of light. The apertured face plate 2, as will hereinafter appear, is movably mounted so that it will properly frame a picture when the machine is being used as a projecting machine. The manner in which this is accomplished will hereinafter be described more in detail. The film passing from the storage reel L first passes over a guide roller 4, is pressed against the rear side of the face plate by means of the spring pressed guide rollers 5 and 6 and finally passes over the guide roller 7 from whence it passes to the storage reel M.

It is necessary to obtain an intermittent movement of the film so as to propel successive portions of the film into operative relation in respect to the aperture of the face plate. This is accomplished by means of the film gripper 3 heretofore referred to. The film gripper 3 which is in fact a film feeding device comprises a movable carriage 8 having guides or guide members 9 that slide along the guideways 10. These guideways 10 are shown as being in the form of rods which are held in place on the partition D by means of brackets 11 and 12. The carriage 8 is normally maintained in its upper position by means of the tension spring 13 one end of which is secured to the carriage and the other end of which is secured to the upper bracket 12. The film extends along a side, 14, of this carriage. A jaw 15 is pivotally mounted at its lower end at 16 on the carriage 8. This jaw 15 has an H-shaped extension 17 which is provided at its upper free end with a roller 18. This roller 18, which serves as an anti-friction member, is engaged by the working faces 19 of a cam 20 that rotates in the direction of the arrow 21. As the cam surface 19 presses against the roller 18 the upper free end of the H-shaped extension will be forced outwardly away from the movable carriage 8 a sufficient distance to cause the gripping jaw 15 to engage the film with sufficient force whereby the latter will be gripped between the jaw 15 and the carriage 8. The further movement of the cam will necessarily force the extension 17 downwardly—as the upper end of the extension cannot move farther away from the carriage 8—and consequently the jaw 15 and the carriage 8 thereupon will be moved downwardly against the tension of the spring 13. The downward movement is enough to move the film from one desired position to its next desired position. As soon as the end 22 of the cam 20 passes beyond or disengages the roller 18 the spring 13 will operate to restore the carriage 8 to its upper position. The upper right hand end of the jaw 15 is comparatively heavy and consequently during the upward movement the jaw will be caused to swing away from the film. It will thus be noted that a continuous movement of the shaft carrying the cam will effect an intermittent feeding of the film from one operative position to the next. The continuous movement of the cam 20 is accomplished through the medium of the main driving shaft 23 (see Figs. 2 and 3) and the gears 24, 25, the former of which—gear 24—is secured to the main driving shaft and the latter of which—gear 25—is secured to the shaft 26 upon which the cam 20 is mounted.

In order to insure the winding of the film G upon the storage magazine or receiving reel M after the film has passed the feeding or gripping device 3 there is provided a take-up belt 27 that passes over a grooved pulley 28 that is on the main shaft and over a grooved pulley 29 that is on the shaft 30 which turns in the storage magazine M. In machines of the class described it is necessary to employ a shutter which is "open" at the time the film is at rest and which is "closed" when the film is in motion, and this is true whether the machine is being employed as a camera or as a projecting machine. It is therefore advisable that the shutter be operated in unison with the gripping device 3. A shutter which operates in the manner just described is designated by O. This shutter is carried on the shaft 31 which has a bevel-gear 32 that meshes with the bevel-gear 33. The gear 33 is on the shaft 34 having a spur-gear 36 that is driven from the gear 24 on the main driving shaft 23. It will therefore be seen that the shutter can be and in fact is timed so that it will be "open" when the gripping means 3 is not operating to move the film G; in other words, when the film is at rest, and that it is also timed so as to be "closed" when the gripping means 3 is propelling the film along the apertured plate 2. When the machine is being used as a camera the apertured plate 2 does not have to be adjustable;

when, however, the machine is being used as a projecting machine, then it is necessary to have the apertured plate 2 adjustable, that is movable up and down or in other words along or longitudinal of the film in order that the picture projected upon the screen will be properly framed. In other words this apertured plate must be mounted so that it can be moved a limited distance along the film in order that the desired portion of the film will be exposed to the light rays.

In order that the objective lenses will be properly centered relative to the aperture in the face plate it is necessary that the objective lenses move with the apertured plate and for this reason the casing of the lenses has been mounted directly upon said plate. The apertured plate 2, as heretofore indicated, is mounted upon the transverse partition D and is held in place on said partition by means of guideways 37. It is adjusted up and down by means of a knob 38 that is secured to the shaft 39 upon which is located the gear 40 that meshes with the rack 41 on the face plate. It will thus be manifest that by merely turning the knob 38 the desired distance the aperture of the face plate 2 will be readily positioned.

The guide roller 4 is a fixed guide roller and is mounted directly upon the partition D and is not movable with the face plate. The guide rollers 5 and 6, however, are mounted upon the face plate so that they move with the latter. These rollers 5 and 6 are held in place by the springs 42 and 43 respectively. These springs press the rollers 5 and 6 against the film with sufficient pressure to insure the proper contacting of the film with the face plate. While part of the guide rollers have been described as being mounted upon the partition and part upon the apertured plate still it will be manifest that they could all have been mounted upon the partition or all upon the apertured plate, this being merely a question of design.

From an inspection of the drawings and from what has preceded it will be observed that the set of condensing lenses J have a horizontally extending focal axis and that they are arranged in the path of the rays of light which are emitted from the source of light H. The objective lenses K also have a horizontally extending focal axis. The condensing lenses J may be referred to as relatively stationary lenses since it is not necessary to adjust these lenses transversely relative to their focal axis during the operation of the machine. The set of objective lenses, however, and also the aperture in the plate are movable up and down, that is transversely relative to the focal axis of the condensing lenses. In other words, successive portions of the film are moved longitudinally downwardly across the condensed light emitted from the condensing lenses, and the objective lenses and the aperture in the plate are moved or adjusted along or longitudinal of the film in order to properly frame the picture which is caused to be exposed by the gripping mechanism positioning or moving successive portions of the film downwardly. It has heretofore been pointed out that with a gripping jaw mechanism it is difficult to predetermine the exact movement of a long film due to varying conditions and in order that the picture will be properly framed the apertured plate has been made movable or adjustable as above described. In order that there will be a proper definition in the projected picture the objective lenses have been connected to the apertured plate so that the objective lenses will always move with the plate and thus be in front of the aperture in the plate. The objective lenses, however, could be made independent of the apertured plate provided some means were employed whereby the objective lenses could be properly positioned as the plate is positioned.

The improvements herein set forth are not limited to the precise construction and arrangement shown and described for they may be embodied in various forms and modifications without departing from the spirit and scope of the invention.

What I claim is:

1. A moving picture machine of the class described having in combination with a portion of the frame a carriage movable on guideways on said frame, a gripping jaw movable toward said carriage to film gripping position and away from said carriage to a position where the jaw does not grip the film, an extension carried by the pivoted jaw member and a cam engaging the free end of said extension in a manner to cause the jaw to move toward the carriage and in a manner to force the jaw and carriage along the guideways while the jaw and carriage are gripping the film between them whereby the film will be moved by the movement which is imparted to the carriage.

2. A picture machine of the class described comprising in combination a vertically extending frame member having thereupon vertically extending guideways, a carriage having guide members which coöperate with said guideways whereby said carriage can move up and down, a spring tending to maintain the carriage in elevated position, a gripping jaw pivoted at its lower end to said carriage so that the gripping end of the jaw can move toward and from said carriage, said gripping jaw having an upwardly extending extension, and a cam which engages the upper free end of said extension in a manner to force the gripping jaw toward said carriage and in a manner to also force the carriage downwardly against the action of said spring while the jaw is gripping a film between it and the carriage.

3. A picture machine of the class described comprising in combination a vertically extending frame member having thereupon vertically extending guideways, a carriage having guide members which coöperate with said guideways whereby said carriage can move up and down, a spring tending to maintain the carriage in elevated position, a gripping jaw pivoted at its lower end to said carriage so that the gripping end of the jaw can move toward and from said carriage, said gripping jaw having an upwardly extending extension and a cam which engages the upper free end of said extension in a manner to force the gripping jaw toward said carriage and in a manner to also force the carriage downwardly against the action of said spring while the jaw is gripping a film between it and the carriage, the material in the jaw member and extension being located so that as the spring returns the carriage to its upper position the free end of the gripping jaw will be automatically moved away from the carriage.

This specification signed and witnessed this 13th day of March, A. D. 1916.

LUTHER E. TAYLOR.

Signed in the presence of—
EDWIN A. PACKARD,
G. McGRANN.